3 Sheets—Sheet 3.
J. STREIT & A. A. BURNS.
Machine for Forming Eyes on Suspension-Rods.
No. 216,065. Patented June 3, 1879.
Fig. 4. Fig. 3. Fig. 5.
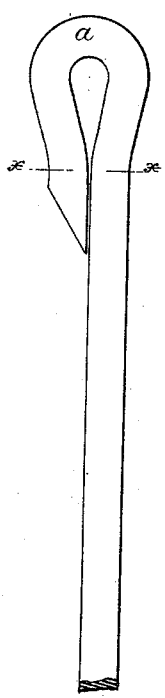
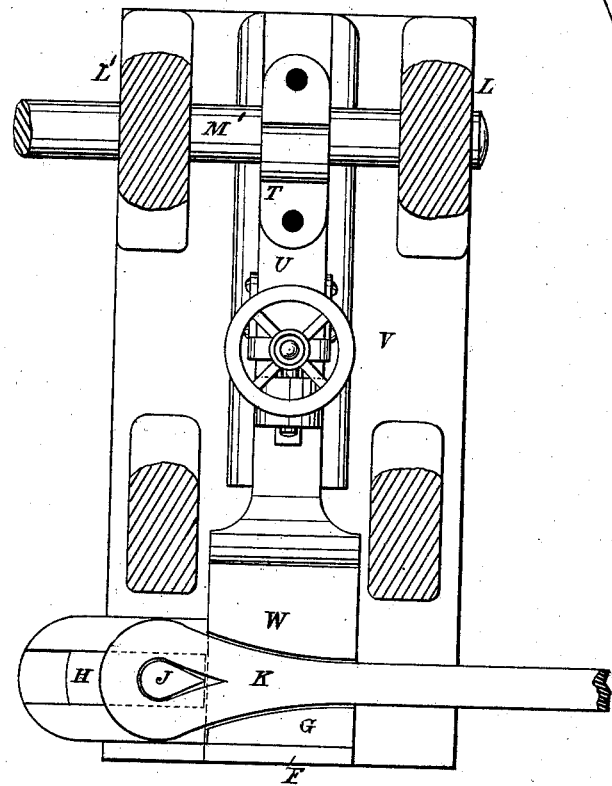
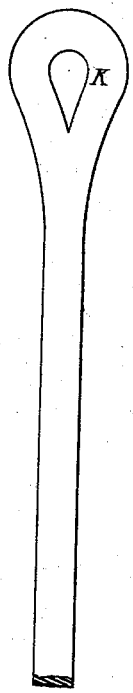
Fig. 6.
WITNESSES: INVENTORS.
Jonathan Ord, Jacob Streit,
Alfred J. Treacy Albert A. Burns,
Josiah W. Ells ATTORNEY
N. PETERS, PHOTO-LITHOGRAPHER, WASHINGTON, D. C.

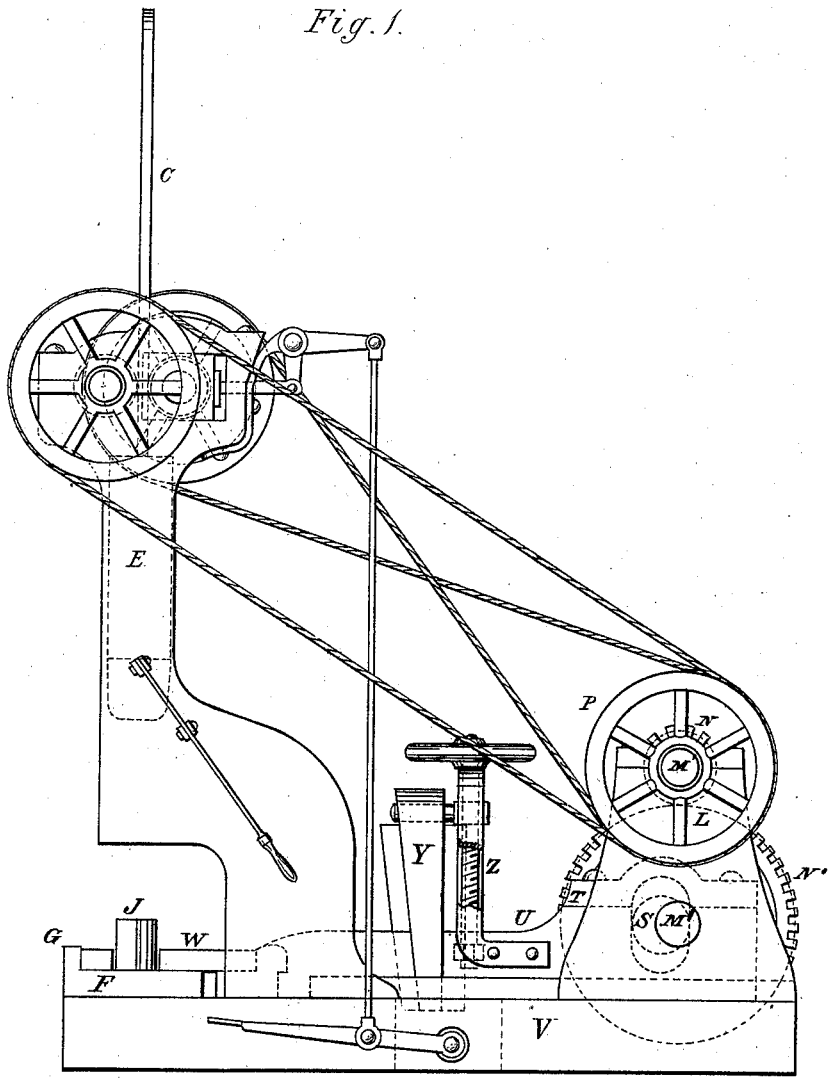

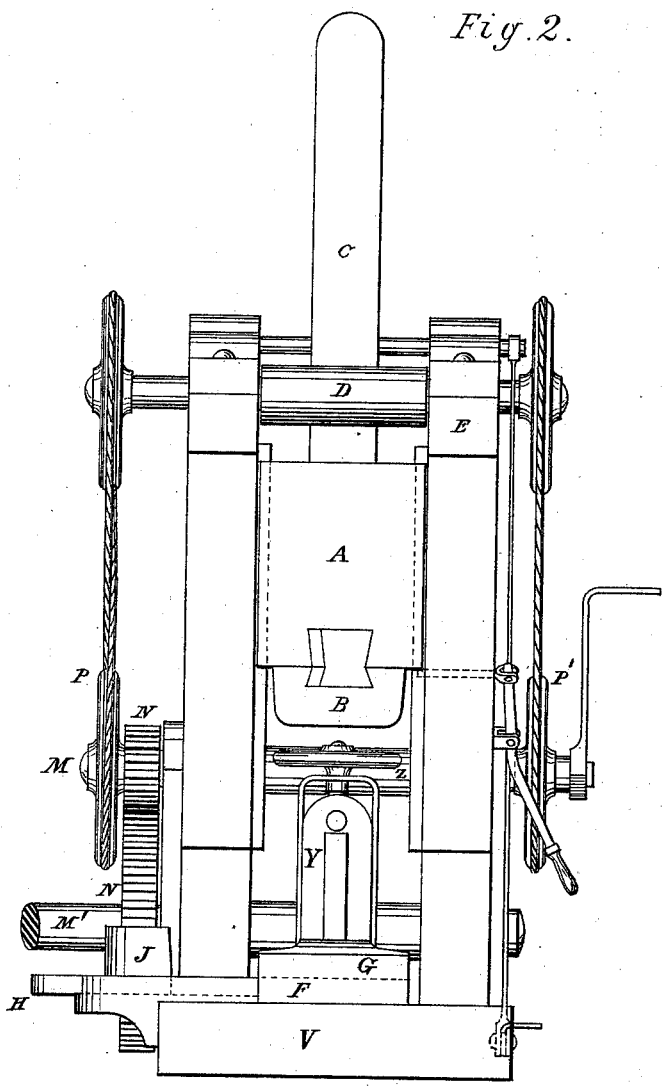

UNITED STATES PATENT OFFICE.

JACOB STREIT AND ALBERT A. BURNS, OF PITTSBURG, PENNSYLVANIA.

IMPROVEMENT IN MACHINES FOR FORMING EYES ON SUSPENSION-RODS.

Specification forming part of Letters Patent No. 216,065, dated June 3, 1879; application filed February 19, 1878.

*To all whom it may concern:*

Be it known that we, JACOB STREIT and ALBERT A. BURNS, of Pittsburg, in the county of Allegheny and State of Pennsylvania, have invented a new and useful Machine for Welding Eyes on Bars and Rods of Wrought-Iron; and we do hereby declare that the following is a full, clear, and exact description of the invention, which will enable others skilled in the art to which it appertains to make and use the same, reference being had to the accompanying drawings, and to letters of reference marked thereon, which form a part of this specification.

In the drawings, Figure 1 represents a side elevation of the machine we use for the purposes above mentioned; Fig. 2, a front elevation, and Fig. 3 a plan, of the same machine. Fig. 4 represents a bar of iron, one end of which is bent to form a loop or eye preparatory to the welding process; Fig. 5, the same bar after being welded, showing the form of the finished eye; Fig. 6, an enlarged transverse section of the bar, Fig. 4, on the line $x$ $x$, illustrating the first effect produced by the machine on that portion of said bar just previous to the action of the drop-hammer.

Heretofore the welded eyes on bars of iron used as suspension-rods and braces in the construction of bridges and works of a similar character have been formed by first bending that part of a rod or bar around a mandrel, so that a short portion next the end so bent shall lie close to and parallel with the main or straight body of the rod or bar for the purposes of welding it thereto; and in the process of union a welding-heat is taken on such adjacent parts, which are immediately submitted to the action of a hammer, the blows of which are brought to bear first on the edge of the bar at the welding-point, and then on its sides alternately, to admit of which a continual turning of the bar by the workman becomes absolutely necessary to enable him to make a good and sufficient weld, requiring great skill on his part to bring the eye to the proper shape and finish. To overcome the difficulties hitherto experienced in the welding of these eyes, and thereby make a better, quicker, and smoother job with less labor and skill, is the principal object of our invention.

To that end we construct a heavy drop-hammer, A, furnished with a plain-faced die, B, the whole being lifted by means of a broad upright board or strap, C, operated on by properly-geared rolls D, arranged at the top of the hammer-supporting frame E, and provided in addition thereto with such holding and releasing mechanism as are used in contrivances of this character, and with all the appliances and appendages necessary to its proper and perfect action, being, in fact, the ordinary drop-hammer commonly employed, and of which no further description is herein deemed requisite.

For the purposes of our invention we combine with this drop-hammer a walled die, F, open at its back and front, the outer wall, G, being stationary and the inner one movable and adjustable. The bottom of this die has a plain surface, and constitutes the anvil, and the inner sides of the walls are so shaped as to conform to the configuration or curve of that part of the eye intended to be operated on. Just back of the widest part of this die, and arranged on the same horizontal plane, is a sliding block, H, that may be made to move at will to or from the die as the work progresses. This sliding block supports an upright mandrel, J, shaped to suit the inside structure of a finished eye, K, and is calculated to operate as a guide to the workman, and also as a means of preventing any collapse or misshape being given to the eye during the welding process, hereinafter described.

Some distance to the rear of the anvil or die F, and on the bed-plate of the hammer, is situate a pair of housings, L L', in which are arranged, one above the other, two horizontal shafts, M M', so geared together by means of appropriate cog-wheels N N' that the upper shaft shall have the quicker rotation. On the ends of this upper shaft are pulleys P P', over each of which runs a belt leading to a similar pulley to drive the lifting-rolls on top of the hammer-frame, and for the purpose of giving proper direction thereto one of the belts is crossed.

The lower shaft, M', is the one through which power is derived to drive and actuate all the parts, and the middle of this shaft is provided with an eccentric, S. (Shown by the dotted lines in Fig. 1.) Around this eccentric is a yoke, T, coupling it with a sliding ram, U, working in suitable guides on the surface of the bed-plate V, and so that the movement given thereto shall be back and forth or to and from the anvil F. To the anvil end of this ram is attached the moving wall W of the die previously mentioned, and so as to travel with it. For the purposes of causing this movable wall W to approach gradually nearer the stationary wall G, as the character of the work progresses, a large vertical wedge, Y, is so placed and united to the contiguous parts of the same that, by means of a tempering-screw, Z, the distance of the sliding wall of the die may be varied with respect to its stationary wall, and that in proportion as the circumstances of case shall require.

A machine or apparatus for the purposes of welding eyes on bars of iron having been constructed as represented, and put in motion by connecting its lower shaft, M', with a steam-engine or other sufficient power, a suitable bar of wrought-iron is to be bent to the form shown in Fig. 4, and a welding-heat given to that part indicated by the cross-line $x\ x$, when it is to be immediately placed in the machine, with its bow or loop $a$ over and around the upright mandrel J, after the manner exhibited in the plan Fig. 3. The ram U will then cause the movable wall of the die to so far advance as to force the welding-hot portions of the bar together until their adjacent edges are completely crushed, the one into the other, and thereby form a swelling of the metal at their place or point of contact similar to the section, Fig. 6. The hammer is then allowed to drop on this swelled portion, and the operations of crushing by the ram and dropping of the hammer also to be continued as long as the workman draws the iron bar back and forth, or until the welding of the parts is duly effected and proper shape given thereto, which shape is fully shown in Fig. 5.

Having described the nature of our invention and the means we employ to accomplish our purpose, we claim—

The reciprocating ram operated by an eccentric and made adjustable by means of a sliding wedge, in combination with the curved walls of the anvil or die and sliding block supporting an upright mandrel, substantially as and for the purposes set forth.

JACOB STREIT.
ALBR. A. BURNS.

Witnesses:
JOSIAH W. ELLS,
JONATHAN ORD.